Nov. 26, 1963   W. HOLZER   3,112,378
DEVICE FOR CHANGING THE PROGRAM OF WASHING MACHINES
Filed May 4, 1960                    2 Sheets-Sheet 1
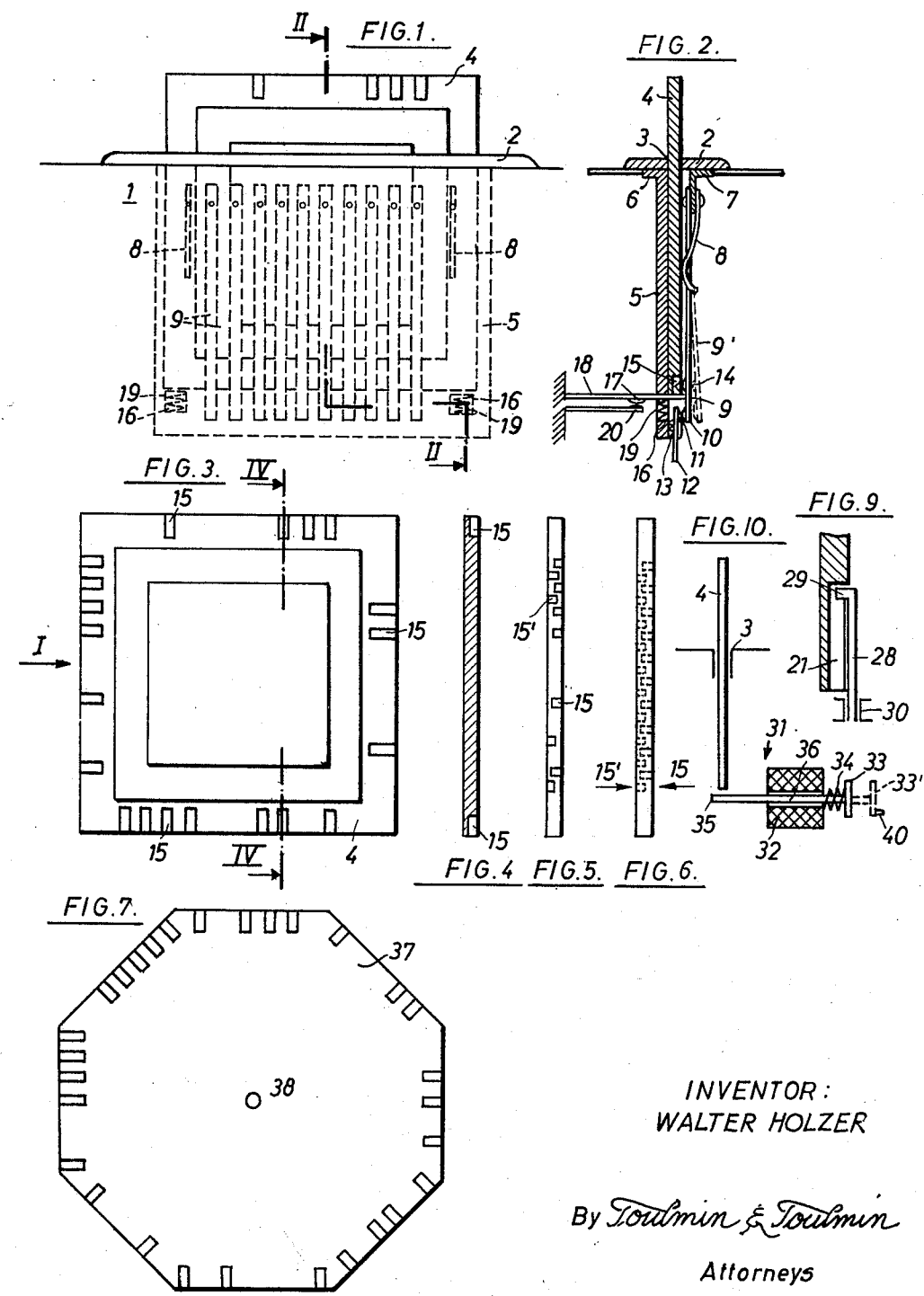
INVENTOR:
WALTER HOLZER
By Toulmin & Toulmin
Attorneys

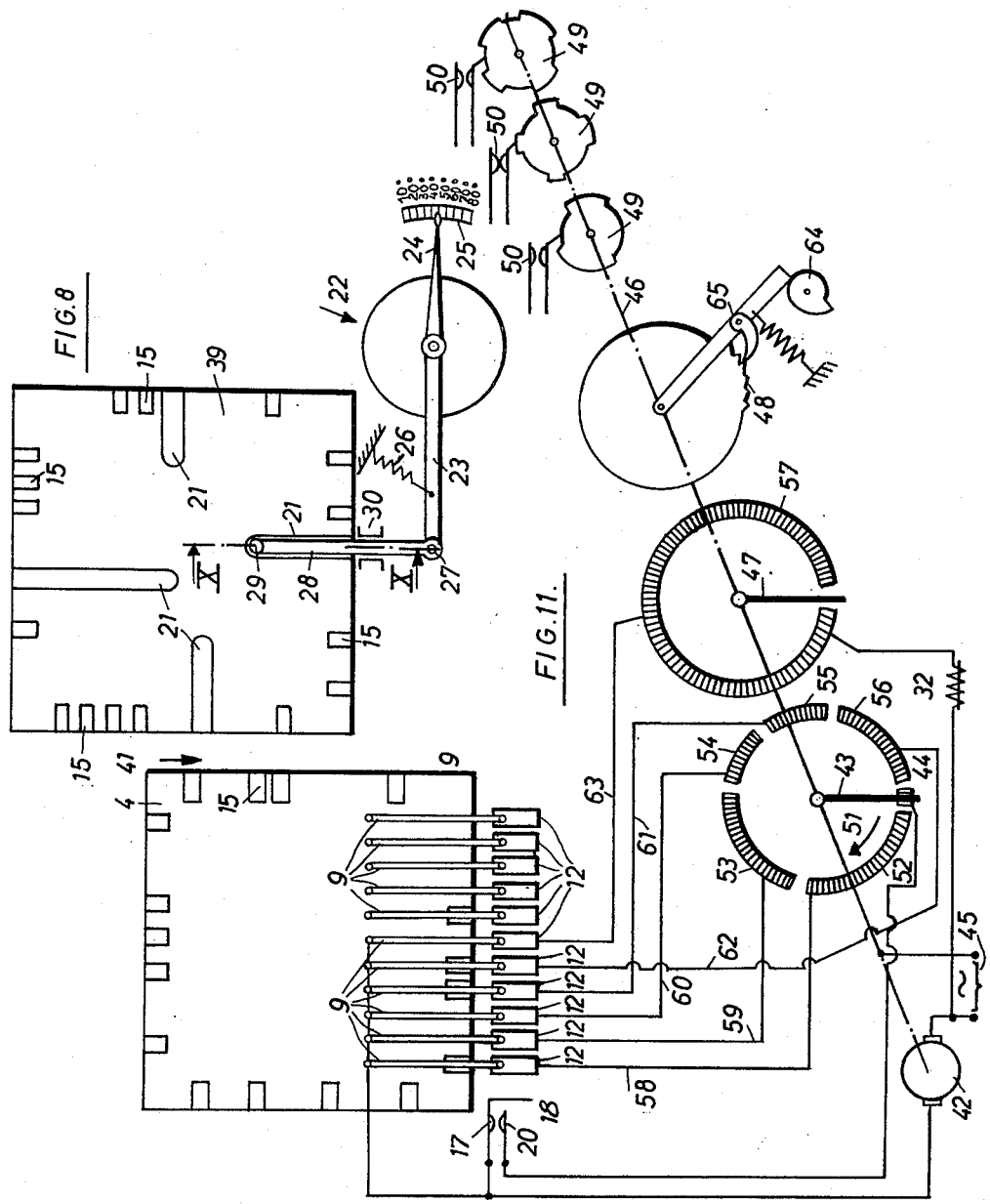

United States Patent Office 3,112,378
Patented Nov. 26, 1963

3,112,378
DEVICE FOR CHANGING THE PROGRAM OF WASHING MACHINES
Walter Holzer, Meersburg (Bodensee), Germany, assignor to Hoover Limited, Perivale, Greenford, Middlesex, England, a firm
Filed May 4, 1960, Ser. No. 26,832
Claims priority, application Switzerland May 28, 1959
14 Claims. (Cl. 200—33)

The present invention relates to automatic washing machines in which the operations are under the control of an automatic timing device capable of executing different programs depending on the operation of different selected combinations of preselecting switching means.

Such a machine according to the present invention is characterized by a program preselection device including a support, and a readily removable operating member, referred to as a key arranged to be received by the support in relation to which it can occupy two or more positions, and to cause different combinations of the preselecting switching means to be operated in different positions, without requiring movement of the key during the course of a program.

In one form of the invention the timing device includes a set of program cams or the equivalent controlling components of the machine to carry out a master program, and movable step by step under the control of interval-terminating means serving to cause the program cams to be advanced one step at the end of each operation, and interval by-passing means for causing the program cams to be advanced a step without delay to omit the corresponding operation of the master program when it reaches that position, the interval by-passing means including one or more circuits including contacts whose operation depends on the position of the program cam and preselecting switching means of the program selection device. In addition to those connected in the interval by-passing circuits the program selection device may include preselecting switching means which directly control condition-responsive circuits, for example circuits containing thermostats or level-responsive contacts.

Preferably the key is in the form of a plate having different combinations of operating means arranged along different edges of it to oeprate different combinations of the preselecitng switching means according to the position of the key in relation to the support. For example, the plate may be square or octagonal. Conveniently the support affords a receptacle in the form of a slot into which the keyplate can be inserted edgewise while the operating means may be in the form of projections or recesses distributed along the edge of the plate in accordance with the combination in question, the operating means of the leading edge of the keyplate, as it is inserted, being operative in each position of the keyplate.

Various forms of automatic clothes-washing machines have previously been proposed in which the operations are under the control of an automatic timing device capable of executing different programs. In certain arrangements the choice of a particular program depends on the closing of different combinations of preselecting contacts, each of which is provided with a separate operating member such as a knob or button, so that to select a particular program the user has to remember to press a number of buttons and errors may readily occur. In addition once a machine has been built and sold with a certain choice of programs it is not an easy matter to vary the choice of programs, for example to provide a program for a new material and even if this is possible it will certainly involve the services of a skilled mechanic.

In another arrangement a separate punched card is provided for each program, and this is inserted in the machine and gradually fed through by a timing mechanism as the program proceeds. This has the disadvantage that the remaining cards must be stored and may easily be lost. In addition the punchings have to be accurate since the timing depends on them and as they have to perform the service of actuating contacts each time the program is performed it is difficult to make the cards sufficiently rugged to stand the wear involved. The need for moving parts at a readily accessible position increases the likelihood of damage. The timing of short intervals is also difficult.

In the arrangements according to the present invention a single key is employed and the user has only to place this in the correct position for the desired program which can be clearly indicated on an associated scale, so that the chance of error is minimized and the burden imposed on the user is negligible. Once the key is in position it does not need to move throughout the program so that wear on it is negligible, and as the timing does not depend on its accuracy it need not be dimensioned within fine limits. A single key suffices and may remain in the machine so that there are no loose parts liable to be lost. At the same time it is a simple matter to provide a new choice of programs merely by supplying a new key, which can be inserted by the user without the need for any expert fitting.

In one form of the invention the keyplate has different combinations of grooves and recesses formed along opposite faces of at least one edge. The possible positions for grooves in one face may be offset from and interleaved between those of the same edge of the other face.

Preferably the face of the keyplate adjacent its trailing edge as it is inserted, bears an inscription or is otherwise formed to identify the combination or program selected. This edge may project from the slot when it is in position so that the identification is readily visible to the user.

In one convenient arrangement the keyplate is arranged to be pressed further into its slot against the action of a spring from its operative position and such movement is arranged to operate contacts causing the program to start.

In addition to controlling the operation of electrical switching means the key may also serve to mechanically control at least one adjustment member. For example the length of a groove in a keyplate may determine the setting of an adjusting member such, for example, as a thermostat.

A blocking device may be provided to prevent immediate re-application of the key to the support when it has been removed. The removal of the key from its support may actuate means for returning the timing device to its initial position, in which case the blocking device may be controlled by a solenoid energized so long as the time device is energized to return itself to the initial position when the key has been removed.

The invention may be carried into practice in various ways but certain specific embodiments will be described by way of example with reference to the accompanying drawings in which:

FIGURE 1 shows the front view of a plate in operational position used to select the program in a fully automatic washing machine;

FIGURE 2 is a cross-sectional view indicated by the line II—II in FIGURE 1;

FIGURE 3 shows a front view of the square plate of FIGURE 1;

FIGURE 4 is a cross-sectional view as indicated by line IV—IV in FIGURE 3;

FIGURE 5 is a side view in the direction of arrow I in FIGURE 3;

FIGURE 6 is one of the side views, corresponding to FIGURE 5, of the plate indicating all the possible positions of the notches;

FIGURE 7 shows an octagonal plate;

FIGURE 8 shows the application of the plate when adjusting a control device mechanically;

FIGURE 9 is a cross-sectional view indicated by line X—X in FIGURE 8;

FIGURE 10 shows a design for a blocking device, and

FIGURE 11 shows, schematically, the application of the plate and switching arrangement for the selection of a program of a fully automatic washing machine.

FIGURE 1 shows the housing 1 of a washing machine with its cover. The cover 2 has a slit 3 for the insertion of a plate 4. The plate 4 is inserted between a guide plate 5 secured to the cover by a flange 6 and an insulating strip 7, fixed on the opposite side of the slot. The strip 7 carries leaf springs 8 and contact springs 9 arranged parallel to one another and carrying moving contacts 10 which co-operate with fixed contacts 11.

The fixed contacts 11 are mounted on the ends of contact springs 12, carried by an insulating strip 13, fixed at the lower end of the guide plate 5. Each moving contact spring 9 has a feeler 14 which co-operates with the plate 4. If the plate 4 has a groove 15 opposite a feeler 14 the feeler will enter the groove 15 and the corresponding contacts 10 and 11 will remain in contact with one another, and an associated control circuit can be closed. This position of contact springs 9 is shown by the full lines in FIGURE 2, while the dotted lines indicating a contact spring 9' correspond to the case when no groove on the plate 4 is opposite a feeler 14.

The bottom of the guide 5 has near each end a square opening 16. Through each of these openings projects a starting contact arm 18 carrying a moving contact 17 co-operating with a fixed contact 20. Each arm 18 is pressed by a spring 19 against the upper edge of the opening 16. When the plate 4 shown in FIGURES 1 and 2 is pressed down, its lower edge engages the arms 18 and presses them down against the action of the springs 19 so that the contacts 17 and 20 are brought into contact with one another.

The square plate 4 has grooves along its edges both on the front face shown in FIGURE 3 and on the reverse face. Grooves 15 on the front face and grooves 15' on the reverse face are shown in FIGURE 5. The number and order of grooves along the four sides of the square, and on the front and reverse faces varies, so that there can be 8 different combinations of grooves in toto.

The dotted lines in FIGURE 6 show ten possible positions where a given number of grooves 15 could be provided on one side and the same number of grooves 15' could be provided on the reverse side. Grooves 15 and 15' are staggered.

It can be seen that when the plate 4 is in the position shown in FIGURES 1 and 2, the grooves 15 receive the feeler 14, whereas when it is turned back to front the grooves 15' do so. The plate 4 need only be of a minimum thickness because the grooves 15 and 15' are staggered.

Every combination of grooves corresponds to a particular program of the washing machine and carries the corresponding inscription, e.g. the front face of the plate may bear indications such as "colored things," "fine," "whites," and "boiling laundry." A timer, shown in FIGURE 11, operates the particular stages of the program, and the sequence and duration of these stages depend upon which of the ten control circuits, in which the ten contact pairs lie, are open.

When the plate 4 is inserted in the slit 3 the inscription "fine" can be seen outside the slit. This corresponds to the combination of grooves along the opposite side of the plate 4 which co-operate with the feelers 14. In order to start the washing process, one has to press the plate down from the position shown in FIGURES 1 and 2 to close the starting contacts 17 and 20. In that way, a starting circuit (FIGURE 11) is closed, which sets the timer in motion. When the plate 4 is released, it is brought back into the position shown, that is, into one of the eight operating positions, by the springs 19 acting on the arms 18.

Selection of the program can be made according to the above description using just one control member, namely the key plate 4 inserted into the slit 3.

In FIGURE 7 a plate 37 is depicted which differs from the plate 4 in FIGURE 3 in being in the form of a regular octagon. With such a plate one can select a total of sixteen different washing programs. The front face of the plate 37 may for example provide the programs for "fine," "colored things," "nylon," "wool," "whites," "boiling laundry," "linens" and "non-iron wash" with their corresponding combinations of grooves. The other face of the plate may provide other programs or may be reserved for new programs should these become necessary when new fabrics or detergents are introduced.

The other parts of the contact device in FIGURES 1 and 2 can be used without any difficulty with the octagonal key plate 37, with the exception that these have to be adjusted to the dimensions of the plate.

It is also possible to mount the plate 37 so that it revolves around a shaft 38, so that the program selection does not take place by removal and reinsertion of the plate 37 in and out of a slot, but by turning the plate 37. Catches can be provided in order to fix the plate in its operative positions, angularly spaced by angles of 45 degrees. Since the plate cannot be turned back to front there are no longer sixteen, but only eight, programs available. On the other hand the plate cannot be lost. The bearings of the revolving shaft 38 of the plate can be shifted against the pressure of springs corresponding to the springs 19 in order to close a starting circuit (FIGURE 11).

FIGURES 8 and 9 show a plate 39 with grooves 15 for switching the control circuits and grooves 21 which mechanically set a thermostat 22 to various temperatures. The thermostat 22 has a regulating lever 23 with a pointer 24 at one end which moves along a temperature scale 25. A spring 26 tends to move the regulating lever 23 in one direction. The other end 27 of the regulating lever 23 is pivoted to a coupling rod 28 of which the end 29 co-operates with the grooves 21 in the plate 39. A guide 30 guides the coupling rod 28 when the plate 39 is removed, so that when the plate 39 is inserted, the end 29 enters the groove 21. Hence the position of the regulating lever 23 and the control of the thermostat, which may for example regulate the temperature of the washing water, depends on the length of the groove 21. Instead of the groove 21, the plate 39 could have a slit or a ridge. In this way not only a thermostat but for example a level control could be operated.

Among the ten control circuits provided, as shown in FIGURES 1 and 2, there is preferably one circuit which is always open in one operative position of the plate 4. When the plate is removed, this control circuit is closed, so that the timer advances rapidly to its initial position (FIGURE 11). In order to prevent the plate 4 from being replaced while the timer is running, causing a partial completion of the selected program, which would not be desirable, an electro-magnetic blocking device 31 is provided as depicted schematically in FIGURE 10.

This blocking device 31 includes an electro-magnet 32 whose armature 33 is carried by a bolt 36 acted on by a spring 34 tending to retract the end 35 of the bolt 36 clear of the plate 4. As long as the timer is advancing back to its initial position the electro-magnet 32 remains energized and holds the armature 33 against the force of the spring 34 projected to the position shown in which the end 35 of the bolt prevents the plate 4 from being replaced into an operative position. When the timer has returned to its initial position, the circuit of the electro-magnet 32 is broken, and the armature 33 is retracted by the action of the spring 34 against a stop 40, so that the plate 4 can again be inserted into one of its operative positions.

FIGURE 11 shows part of the electric circuit, with the plate 4 inserted in the slit 3 in the position occupied immediately before starting. When the plate 4 is pressed down in the direction of the arrow 41 the starting contacts 17 and 20 shown in FIGURE 2 are closed, connecting an advancing motor 42 to a supply 45 through the starting contacts, a brush 43 and conducting segment 44. A main program cam-shaft 46 is connected to the revolving shaft of the advancing motor 42 through a coupling and gearing (not shown). The brush 43, a brush 47, a ratchet wheel 48 and a number of program cams 49 are mounted on the program cam-shaft 46. Other parts are not included since they are not necessary to an understanding of the operation of the plate 4. Program cams 49 close operating contacts 50 which energize the various components of the fully automatic washing machine, e.g. heating means, washing motor, valves, etc., either directly or through relays.

The position shown is the initial position which is always distinguished by the fact that the brush 43 is on the conductng segment 44. After operation of starting contacts 17, 20 the brush 43 is turned in the direction of the arrow 51 in the way described above. It leaves the segment 44 and reaches a segment 52.

The advancing motor 42 may be energized through control circuits 58, 59, 60, 61, 62 and 63 through corresponding segments 52, 53, 54, 55, 56 and 57 and through brushes 43 and 47, while the pairs of contacts 12 and 9 assigned to the segments are closed. In the position of the plate 4 shown, the grooves are positioned so that control circuits 58, 61 and 62 may be closed. That means that the brush 43, as soon as it reaches the segments 52, 55 and 56, connects the advancing motor 42 to the supply. In that way the motor 42 moves the program cam-shaft 46 through arcs corresponding to these segments. The method of operation is as follows.

When the brush 43 passes from the segment 52 to the segment 53, the advancing motor 42 stops, and the program cam-shaft 46 remains in this position until the ratchet wheel 48 is moved by means of a pawl 65 actuated by a spiral cam 64. The cam 64 is driven by a timer motor (not shown). In this way the program cam-shaft 46 is moved step-by-step at timed intervals until the brush 43 reaches the segment 55. At that moment, the advancing motor 42 is again energized through the control circuit 61, and advances the program cam-shaft and with it the brush 43 back to the initial position, on to the segment 44. Depending upon the number and combination of grooves 15 the operations corresponding to different arcs of the program cams will be by-passed by this action of the brush 43 or allowed to occur for timed intervals under the control of the pawl 65. When the plate 4 is removed from the slit 3, current flows through the control circuit 63, the corresponding contacts 9, 12, the segment 57 and the brush 47, so that the advancing motor 42 is energized until the brush 47 leaves the segment 57, which only occurs when the program cams have returned to their initial position.

Throughout the program the brush 47 is always on the segment 57 and this is used to energize the electro-magnet 32. If, during the cycle, the plate 4 is pulled out of the slit 3, the bolt 36 is projected into the path of the plate 4 by the electro-magnet 32, and prevents the replacement of the plate 4 before the program cams have returned to their initial position. Only in the initial position does the brush 47 move from the segment 57 and de-energize the electro-magnet, allowing the spring 34 to retract the bolt 36 so that the plate 4 can be inserted fully into the slit 3.

The other contacts 9, 12 in FIGURE 11 not included in the circuit diagram select other control circuits, for example, temperature, water level, and the like.

The invention can be used in all cases of program selection in fully automatic washing machines. The embodiments shown in the drawings are only examples. Instead of control circuits 58–63 other control circuits can certainly be built that will lead to similar effects. In particular, it might be feasible to modify the action of the timing motor with its spiral cam 64, to change the duration of an interval in order to alter the program times.

I claim:
1. In a washing machine, in combination, an automatic timing device for carrying out different selected washing programs, a plurality of electric switches connected in circuit with said timing device to preselect different programs depending upon the actuation of different combinations of selected switches, a support for holding said switches in spaced apart relationship, a key for application to said support for actuation of said switches, means formed on said key for the selective actuation of different selected combinations of said switches, the arrangement being such that when said key is applied to said support in one position, said means actuates one selected combination of said switches to set in motion a selected washing program and when said key is applied to said support in another position said means actuates another selected combination of said switches to set in motion a different selected washing program.

2. In a washing machine according to claim 1 in which said timing device includes a set of program cams which control the various components of the machine to carry out a master program, interval terminating means operable to move said cams in a step by step manner to advance them one step at the end of each operation and interval by-passing means operable to advance said cams immediately and omit certain operations of the master program, said interval by-passing means including certain of said switches the actuation of which depends upon the position in which said key is applied to said support.

3. In a washing machine according to claim 2 in which said key when applied to said support actuates switches controlling condition responsive means.

4. In a washing machine according to claim 1 in which said key is in the form of a plate having switch actuating means formed along at least two of its edges, the actuating means on different edges being formed to actuate different combinations of said switches as it is applied to said support to bring one of said means into co-operative relationship with a selected combination of said switches.

5. In a washing machine according to claim 4 in which said support is in the form of a receptacle having an open slot into which said plate is inserted edgewise.

6. In a washing machine according to claim 5 including a program starting switch in said receptacle positioned for actuation by said plate when said plate is pushed inward beyond its normal operative position and spring means for biasing said plate outwardly to its normal operative position.

7. In a washing machine according to claim 4 in which said switch actuating means is in the form of recesses arranged along the edges of said plate.

8. In a washing machine according to claim 4 in which said switch actuating means is formed on opposite faces along at least one edge of said plate.

9. In a washing machine according to claim 8 in which said switch actuating means on one face of said plate are offset from that on the other face.

10. In a washing machine according to claim 4 in which said plate is supported about a central pivot.

11. In a washing machine according to claim 4 including a slot formed in one face of said plate for actuating an adjusting member for controlling the setting of a thermostat.

12. In a washing machine according to claim 1 including means for preventing the reapplication of said key to said support into its switch actuating position when it is removed therefrom until said timer has completed its cycle.

13. In a washing machine according to claim 1 in which one of said switches is operative when actuated to return said timing device to its initial off position and key is formed to actuate said one switch as it is removed from said support.

14. A program selecting device for an automatic washing machine comprising, a receptacle, said receptacle being formed with a cavity including an entrance slot, a polygonal key plate having a plurality of edges for edgewise insertion into said slot in any one of a plurality of positions and a plurality of preselection switches positioned in said cavity for actuation by an edge of said key plate as the latter is inserted into said cavity through said slot, each edge of said key plate being formed with switch actuating elements each constructed to actuate a different combination of said switches.

References Cited in the file of this patent

UNITED STATES PATENTS

| | | |
|---|---|---|
| 2,166,194 | Roman et al. | July 18, 1939 |
| 2,288,770 | Armbruster | July 7, 1942 |
| 2,342,517 | Nevin | Feb. 22, 1944 |
| 2,473,664 | Taylor | June 21, 1949 |
| 2,712,309 | Offener | July 5, 1955 |
| 2,794,869 | Noregaard | June 4, 1957 |
| 2,868,452 | Dougherty | Jan. 13, 1959 |

FOREIGN PATENTS

| | | |
|---|---|---|
| 1,133,826 | France | Nov. 26, 1956 |